UNITED STATES PATENT OFFICE.

WILHELM GRÜTTEFIEN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

ISOBUTYL ESTER OF PARA-AMINO-BENZOIC ACID.

958,110.  Specification of Letters Patent.  Patented May 17, 1910.

No Drawing.  Application filed August 17, 1909. Serial No. 513,335.

*To all whom it may concern:*

Be it known that I, WILHELM GRÜTTEFIEN, doctor of philosophy, chemist, citizen of the German Empire, residing at Vohwinkel, near Elberfeld, Germany, have invented new and useful Improvements in Isobutyl Esters of Para - Amino - Benzoic Acids, of which the following is a specification.

According to my invention the hitherto unknown isobutyl ester of para-aminobenzoic acid can be obtained by treating para-aminobenzoic acid or its derivatives with isobutyl alcohol or its derivatives.

The new ester is a valuable compound having anesthetic properties, forming salts with acids which also produce local anesthesia and is probably produced according to the following formula:

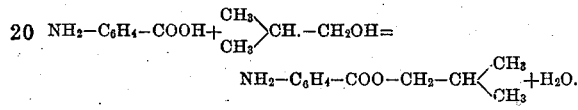

In order to illustrate the new process more fully the following example is given, the parts being by weight: A mixture of 35 parts of para-aminobenzoic acid, 50 parts of isobutyl alcohol and 10 parts of concentrated hydrochloric acid (1.19 sp. g.) is saturated with hydrochloric acid gas while the mixture is being heated to about 100° C. for several hours. After cooling, the product of reaction is dissolved in water, the aqueous solution is rendered alkaline and is then shaken with ether. The new ester is then obtained as the hydrochloric acid salt by passing hydrochloric acid gas into the ethereal solution. The hydrochlorid melts at about 242° C. From the hydrochlorid, the free ester can be obtained by treatment with a solution of carbonate of sodium. It is a white powder soluble in alcohol, benzene and ether but only with difficulty in water. It crystallizes from ligroin in the shape of white needles melting at 65° C.

I claim:—

The herein described isobutyl ester of para-aminobenzoic acid, obtainable from this acid and isobutyl alcohol, which ester crystallizes from ligroin in the shape of white needles melting at 65° C., soluble in alcohol, benzene and ether and scarcely soluble in water, forming salts with acids which retain the valuable therapeutic properties exhibited by the ester, substantially as described.

In testimony whereof I have hereunto set my hand in the presence of two subscribing witnesses.

WILHELM GRÜTTEFIEN. [L. S.]

Witnesses:
OTTO KÖNIG,
WILLY KLEIN.